W. H. ELLIOTT.
CHECK VALVE.
APPLICATION FILED AUG. 30, 1920.
1,388,246.
Patented Aug. 23, 1921.
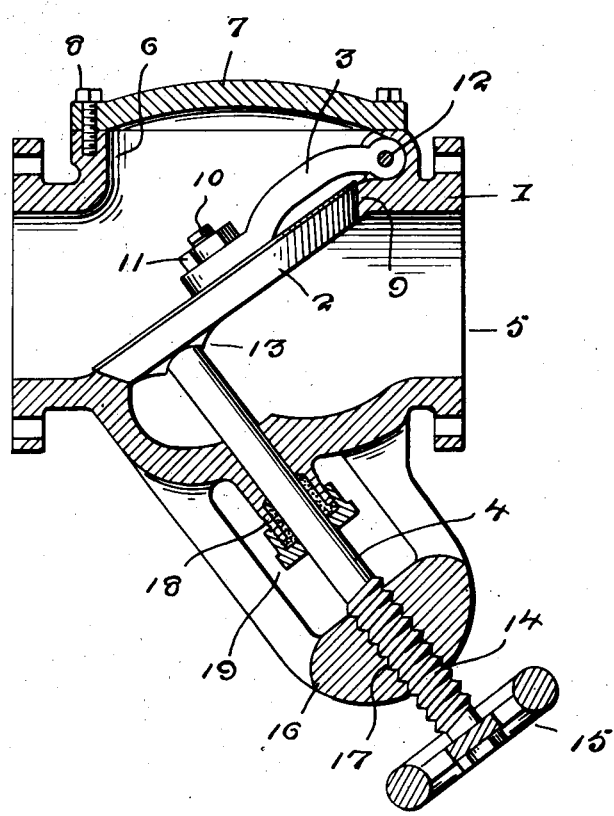
Witness
WILLIAM H. ELLIOTT
INVENTOR

UNITED STATES PATENT OFFICE.

WILLIAM H. ELLIOTT, OF WASHINGTON, DISTRICT OF COLUMBIA, ASSIGNOR OF ONE-FOURTH TO WILLIAM F. WALTER, OF WASHINGTON, DISTRICT OF COLUMBIA.

CHECK-VALVE.

1,388,246.  Specification of Letters Patent.  Patented Aug. 23, 1921.

Application filed August 30, 1920. Serial No. 406,840.

*To all whom it may concern:*

Be it known that I, WILLIAM H. ELLIOTT, a citizen of the United States, residing at Washington, of the District of Columbia, have invented new and useful Improvements in Check-Valves, of which the following is a specification.

My present invention has for its object the provision of a check valve of improved construction designed to be used to advantage to prime pumps or to drain tanks or stand pipes or as a regular stop valve to hold pressure or to release pressure, and this in varying degree.

To the attainment of the foregoing the invention consists in the improvement as hereinafter described and definitely claimed.

In the accompanying drawing, hereby made a part hereof:—

The figure is a vertical section illustrating my novel check valve.

In addition to a casing 1, the check valve comprises a valve body 2, an arm 3 to carry the valve body and an adjusting stem 4.

In the preferred embodiment of my invention the casing 1 is provided with alined orifices 5, and with a top opening 6, normally closed by a plate 7, connected to the casing 1 by lag screws 8. Intermediate of the orifices 5 the casing is provided with a diagonally disposed seat 9 that is preferably beveled as shown and is designed to receive the correspondingly beveled edge of the body 2.

The body 2 in the preferred embodiment of the invention is provided with a threaded stem 10 for the connection of the body to the arm 3, the said stem 10 receiving a nut 11 that is arranged against the other side of the arm. Manifestly this construction permits of ready connection of the body 2 to the arm 3. Moreover said connection is readily accessible through the top opening 6. The arm 3 is pivotally connected at 12 to the casing so as to enable the body 2 to freely swing to and from its seat. At its underside the body 2 is provided with a depression 13 for the reception of the inner and upper end of the stem 4, said stem being threaded at 14 and being provided with an appropriate handle 15.

In connection with the stem 4 I would have it understood that the casing 1 is provided with an inclined and preferably open work pendent extension 16 in the lowermost portion of which is a threaded bore 17 that affords a bearing for the threaded portion 14 of the stem 4. Within open work portion of the casing extension 16 and carried on the lower portion of the casing proper is a stuffing box 18 through which the stem extends and by which leakage between the casing and the stem is prevented. It will be apparent in this connection that the gland 19 of the stuffing box is readily accessible through the opening in the extension 16.

It will be apparent from the foregoing that through the medium of the adjustable stem 4, the valve body 2 may be nicely adjusted or positioned to hold pressure or to release pressure in any degree desired.

Having described 'my invention, what I claim and desire to secure by Letters-Patent, is:—

A check valve comprising a casing having alined orifices and also having an opening in its top and an open work extension pendent from its bottom and provided with a threaded bore, a plate to close the top opening of the casing and detachably connected to the casing, a diagonally-arranged valve body in the casing and opposed to a valve seat therein, said valve body having a stem, an arm arranged at the pressure side of the valve body and hingedly connected to the casing and receiving the said stem, a nut mounted on the stem above the arm, a stuffing box carried by the casing and disposed within the extension thereof, and a threaded stem bearing in the threaded bore of the casing extension and extending through the stuffing box and into the casing and having its inner end disposed in a depression of the valve body.

In testimony whereof, I affix my signature.

WILLIAM H. ELLIOTT.